United States Patent
Kreitler et al.

(10) Patent No.: US 6,695,409 B2
(45) Date of Patent: Feb. 24, 2004

(54) ONE-PIECE ARMREST/RECLINER BRACKET

(75) Inventors: Thomas E. Kreitler, Farmington Hills, MI (US); Hans S. Grohs, Royal Oak, MI (US); Frank T. Eupizi, Harrison Township, MI (US); David M. Schacht, Canton, MI (US)

(73) Assignee: Intier Automotive Inc., Newmarket (CA)

( * ) Notice: Subject to any disclaimer, the term of this patent is extended or adjusted under 35 U.S.C. 154(b) by 0 days.

(21) Appl. No.: 10/175,705

(22) Filed: Jun. 20, 2002

(65) Prior Publication Data

US 2003/0234568 A1 Dec. 25, 2003

(51) Int. Cl.$^7$ .................................................. A47C 7/02
(52) U.S. Cl. ................ 297/452.18; 297/463.1
(58) Field of Search ............ 297/452.18, 411.29, 297/411.39, 411.38, 411.32, 452.2, 463.1

(56) References Cited

U.S. PATENT DOCUMENTS

| | | | |
|---|---|---|---|
| 3,578,379 A | | 5/1971 | Taylor et al. |
| 4,400,033 A | * | 8/1983 | Pietsch |
| 5,033,792 A | * | 7/1991 | Kanazawa |
| 5,131,721 A | | 7/1992 | Okamoto |
| 5,297,839 A | | 3/1994 | Fukushima |
| 5,909,926 A | | 6/1999 | Gonzalez |
| 5,918,943 A | | 7/1999 | Mitschelen et al. |
| 6,132,003 A | | 10/2000 | Sakurai et al. |
| 6,238,002 B1 | | 5/2001 | Brewer et al. |
| 6,328,384 B1 | | 12/2001 | Yamauchi et al. |
| 6,361,114 B1 | | 3/2002 | Rumler |

\* cited by examiner

Primary Examiner—Laurie K. Cranmer
(74) Attorney, Agent, or Firm—Clark Hill PLC

(57) ABSTRACT

A seat assembly mounted on a floor of a motor vehicle includes a seat cushion having a seat cushion frame operatively secured to the floor. The seat assembly also includes a seat back having a seat back frame including side members and an upper crossmember extending between the side members fixedly secured to the seat cushion frame. A recliner mechanism is fixedly secured to the seat cushion frame for pivotally moving the seat back relative to the seat cushion, and an armrest is connected to one of the side members. In addition, a bracket includes a base and first and second mounting arms extending out from the base. The base is fixedly secured to one of the side members. The armrest is secured to the first mounting arm and the recliner mechanism is secured to the second mounting arm such that the bracket maintains a predetermined distance between the armrest and the recliner mechanism.

4 Claims, 3 Drawing Sheets

ONE-PIECE ARMREST/RECLINER BRACKET

BACKGROUND OF THE INVENTION

1. Field of the Invention

The invention relates to a seat assembly for a motor vehicle. More particularly, this invention relates to a seat assembly including a seat back frame and a bracket for securing an armrest and a recliner mechanism thereto.

2. Description of Related Art

A motor vehicle seat includes a seat cushion and a seat back that pivots relative to the seat cushion. The seat back includes a seat back frame. Typically, the seat back frame is made from steel or aluminum. The use of either of these materials for the seat back frame, however, requires additional structural elements to allow the seat back frame to withstand various loads. For example, seat back frames made from steel require a reinforcement tube placed therewithin. Meanwhile, aluminum seat back frames require support plates to be attached to the outside thereof.

In addition to the structural load bearing elements that must be added on to the seat back frame, a number of brackets must also be affixed to the seat back frame to secure various components, such as armrests and recliner mechanisms, thereto. More particularly, two separate brackets must be attached to each side of the seat back frame; one to secure the armrest to the seat back frame and another to secure the recliner mechanism to the seat back frame. The welding of two separate brackets to each side of the seat back frame, however, results in increased cycle time. In addition, the use of two separate brackets requires that the relative location between the brackets be constantly maintained during assembly.

SUMMARY OF THE INVENTION

A seat assembly mounted on a floor of a motor vehicle includes a seat cushion having a seat cushion frame operatively secured to the floor. The seat assembly also includes a seat back having a seat back frame including side members and an upper crossmember extending between the side members fixedly secured to the seat cushion frame. A recliner mechanism is fixedly secured to the seat cushion frame for pivotally moving the seat back relative to the seat cushion, and an armrest is connected to one of the side members. In addition, a bracket includes a base and first and second mounting arms extending out from the base. The base is fixedly secured to one of the side members. The armrest is secured to the first mounting arm and the recliner mechanism is secured to the second mounting arm such that the bracket maintains a predetermined distance between the armrest and the recliner mechanism.

BRIEF DESCRIPTION OF THE DRAWINGS

Advantages of the invention will be readily appreciated as the same becomes better understood by reference to the following detailed description when considered in connection with the accompanying drawings wherein.

DETAILED DESCRIPTION OF THE PREFERRED EMBODIMENT

Figure 1:
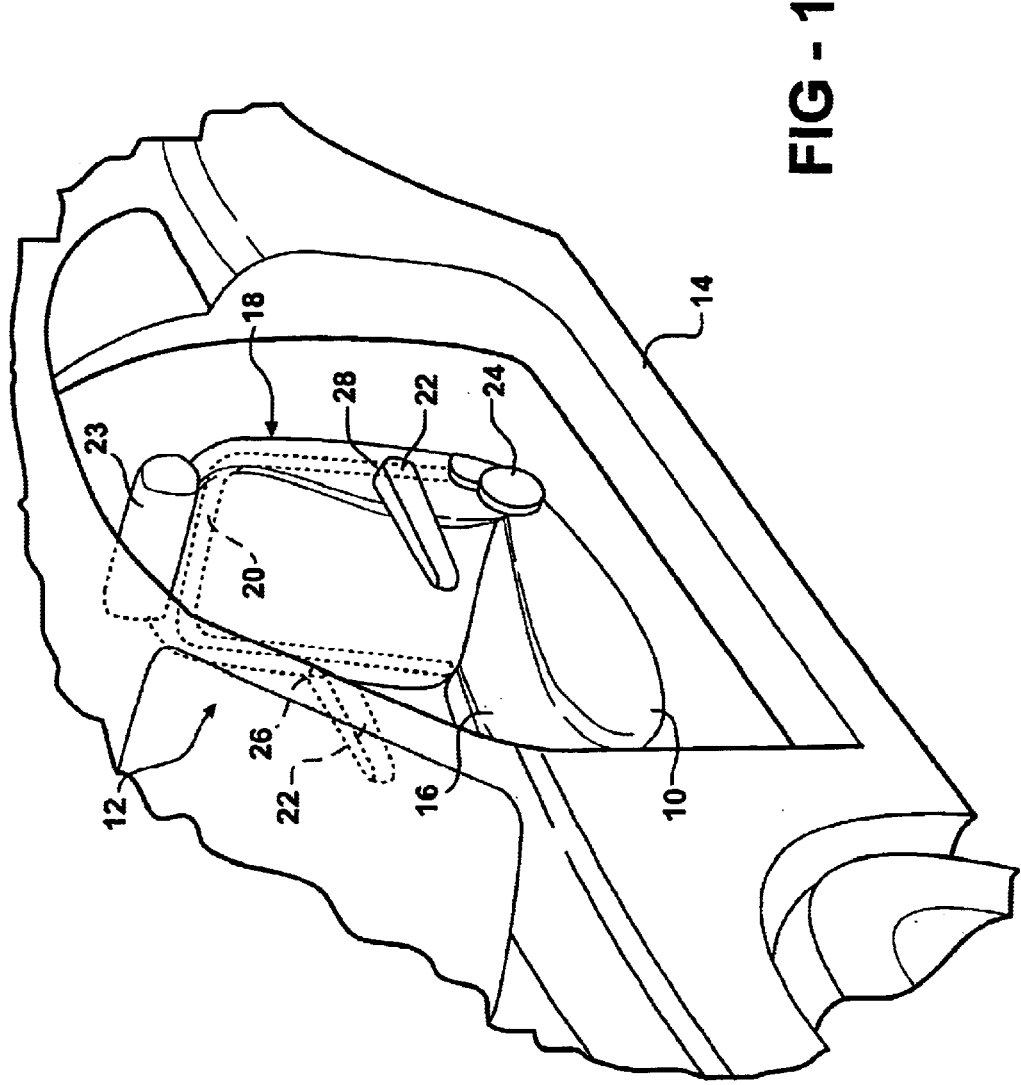
FIG. 1 is a cut-away, perspective view of a motor vehicle showing a seat mounted within a passenger compartment thereof.

Referring to FIG. 1, a seat assembly, generally indicated at 10, for supporting an occupant thereon is mounted on a floor 12 within a passenger compartment 14 of a motor vehicle 16. The seat assembly 10 includes a seat cushion 18 operatively secured to the floor 12, and a seat back 20 pivotal relative to the seat cushion 18. The seat cushion 18 includes a seat cushion frame 22. The seat back 20 includes a seat back frame 24, which is made from steel, aluminum, or other suitable materials. The seat assembly 10 also includes an armrest 26, which provides the occupant with a resting place for their arms, and a headrest 28 for supporting an occupant's head. In addition, the seat assembly 10 includes a recliner mechanism 30 for pivotally moving the seat back 20 relative to the seat cushion 18.

Figure 2:
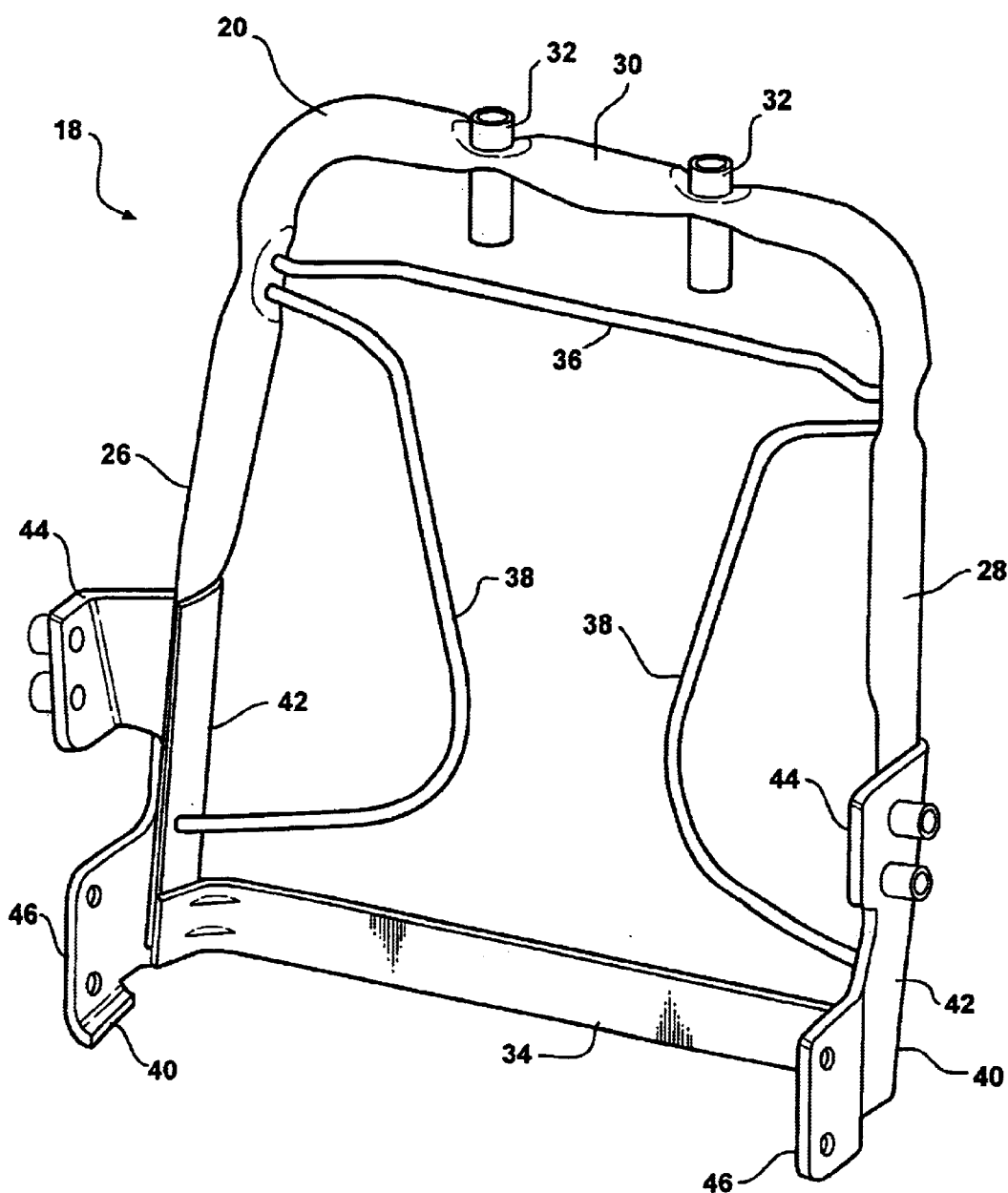
FIG. 2 is a perspective view of a seat assembly of one embodiment of the invention.

Referring to FIG. 2, the seat back frame 24 includes side members 32, 34 and an upper crossmember 36 extending between the side members 32, 34. The side members 32, 34 have a crimped, lower end 35. The upper crossmember 36 includes a plurality of headrest guides 38 for securing the headrest 28 thereto. A support brace 40 and an upper brace 42 are secured to the side members 32, 34 and extend therebetween to provide additional load bearing support to the seat back frame 24. The seat back frame 24 also includes a pair of foam reinforcement members 44 mounted to the side members 32, 34 for supporting the seat back 20. An integrally formed, one-piece bracket 46 is fixedly secured to each of the side members 32, 34. The bracket 46 is either welded or fastened by suitable fasteners to the side members 32, 34 at the crimped, lower end 35 thereof. The crimped, lower end 35 promotes a more secure connection between each of the side members 32, 34 and the bracket 46.

Figure 3:
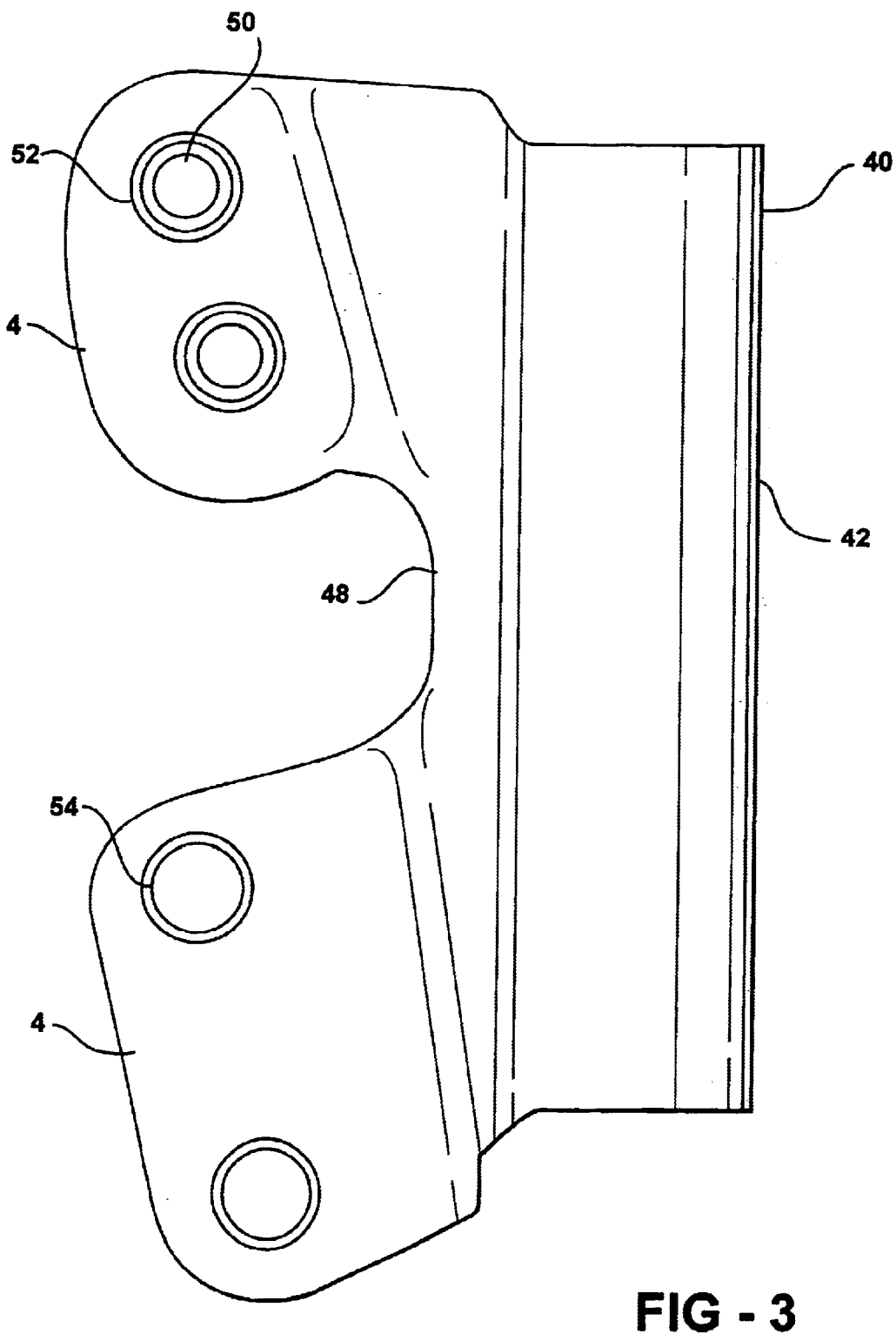
FIG. 3 is a side view of one of a plurality of brackets of the seat assembly of one embodiment of the invention.

Referring to FIG. 3, the bracket 46 includes a base 48 having a first mounting arm 50 and a second mounting arm 52 extending out therefrom. The base 48 defines a predetermined distance between the first 50 and second 52 mounting arms so that the first mounting arm 50 is spaced apart from the second mounting arm 52. The first mounting arm 50 includes a plurality of raised cylindrical bosses 54 each defining an aperture 56 for securing the armrest 26 thereto. Although the first mounting arm 50 is shown including the plurality of raised cylindrical bosses 54, it is appreciated that the armrest 26 may be secured to the first mounting arm 50 in any number of ways. In addition, it should be appreciated that the armrest 26 may be fixedly secured to the first mounting arm 50 or it may be movably mounted, i.e., pivotally mounted, thereto. The second mounting arm 52 includes a plurality of apertures 58 for securing the recliner mechanism 30 thereto. And although the plurality of apertures 58 is shown, it is appreciated that the recliner mechanism 30 may be secured to the second mounting arm 52 in any of a number of ways.

The base 48 also includes a forward portion 60, a back portion 62, and a connecting segment 64 extending between the forward 60 and back 62 portions. The forward 60 and back 62 portions may be parallel to one another. At the same time, the forward 60 and back 62 portions are not co-planar. The connecting segment 64 separates the forward 60 and back 62 portions. The connecting segment 64 defines a non-zero angle with each of the forward 60 and back 62 portions preventing the two portions 60, 62 from being coplanar so that each of the forward portion 60, back portion 62 and connecting segment 64 extend through a separate plane. Thus, the first 50 and second 52 mounting arms, which are fixedly secured to the forward portion 60, as well as the armrest 26 and the recliner mechanism 30, which are secured to the first 50 and second 52 mounting arms, are also not co-planar with the back portion 62.

The base 48 defines a longitudinally extending rear edge 66 fixedly secured to one of the side members 32, 34 to position the first 50 and second 52 mounting arms relative to one of the side members 32, 34. Thus, the rear edge 66 allows the bracket 46 to be constantly maintained along the side members 32, 34 during manufacture of the seat assembly 10. The first 50 and second 52 mounting arms extend out from the base 48 transverse to the rear edge 66.

By having the armrest 26 and the recliner mechanism 30 secured to the first 50 and second 52 mounting arms respectively of the bracket 46, it can be assured that the predetermined distance between the armrest 26 and the recliner mechanism 30 can be maintained. As a result, there is no need to constantly align the armrest 26 and the recliner mechanism 30 along the side members 32, 34 during manufacture of the seat assembly 10.

The invention has been described in an illustrative manner. It is to be understood that the terminology, which has been used, is intended to be in the nature of words of description rather than of limitation. Many modifications and variations of the invention are possible in light of the above teachings. Therefore, within the scope of the appended claims, the invention may be practiced other than as specifically described.

What is claimed is:

1. A seat assembly mounted on a floor of a motor vehicle, said seat assembly comprising:

a seat cushion having a seat cushion frame operatively secured to the floor;

a seat back having a scat back frame including side members and an upper cross member extending between said side members fixedly secured to said seat cushion frame;

a recliner mechanism fixedly secured to said seat cushion frame for pivotally moving said seat back relative to said seat cushion;

an armrest connected to one of said side members; and a one-piece bracket including a base defining a longitudinally extending rear edge and first and second spaced apart mounting arms extending out from said base transverse to said rear edge, said base being fixedly secured to one of said side members and defining a predetermined distance extending between said first and second mounting arms, said base further defining a forward portion fixedly secured to said first and second mounting arms, a back portion, and a connecting segment extending between said forward and back portions wherein said forward portion, back portion, and connecting segment extend through different planes, said first mounting arm including a plurality of raised cylindrical bosses defining an aperture, wherein said armrest is secured to said plurality of raised cylindrical bosses of said first mounting arm and said recliner mechanism is secured to said second mounting arm such that said bracket maintains a predetermined distance between said armrest and said recliner mechanism.

2. A seat assembly as set forth in claim 1 wherein said second mounting arm includes a plurality of mounting apertures for securing said recliner mechanism thereto.

3. An integrally formed one-piece bracket for securing an armrest and a recliner mechanism to a seat back frame including side members and an upper cross member extending between the side members, said bracket comprising:

a base defining a longitudinally extending rear edge for fixedly securing said bracket to one of the side members, said base defining a forward portion, a back portion, and a connecting segment extending therebetween wherein said forward portion, back portion, and connecting segment extend through different planes;

a first mounting arm extending out from said forward portion of said base transverse to said rear edge and including a cylindrical boss defining an aperture for securing the armrest thereto; and a second mounting arm spaced apart from said first mounting arm and extending out from said forward portion of said base transverse to said rear edge for securing the recliner mechanism thereto, wherein said second mounting arm is maintained at a predetermined distance from said first mounting arm by said base.

4. A bracket as set forth in claim 3 wherein said second mounting arm includes a mounting aperture for securing the recliner mechanism thereto.

* * * * *

UNITED STATES PATENT AND TRADEMARK OFFICE
CERTIFICATE OF CORRECTION

PATENT NO. : 6,695,409 B2
DATED : February 24, 2004
INVENTOR(S) : Thomas E. Kreitler et al.

It is certified that error appears in the above-identified patent and that said Letters Patent is hereby corrected as shown below:

Column 3,
Line 34, "scat" should be -- seat --.

Signed and Sealed this

Fifteenth Day of June, 2004

JON W. DUDAS
*Acting Director of the United States Patent and Trademark Office*